Jan. 25, 1966   W. D. STRUBY   3,230,968
COMBINATION VALVE AND GAUGE
Filed April 11, 1961   6 Sheets-Sheet 1

INVENTOR
WILLIAM D. STRUBY

BY *Stevens, Davis, Miller & Mosher*
ATTORNEYS

Jan. 25, 1966 W. D. STRUBY 3,230,968
COMBINATION VALVE AND GAUGE
Filed April 11, 1961 6 Sheets-Sheet 2
FIG. 3.
FIG. 4.
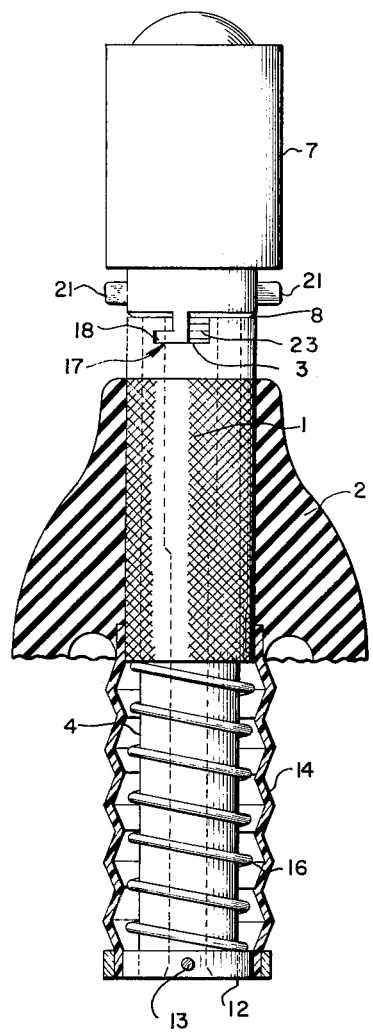
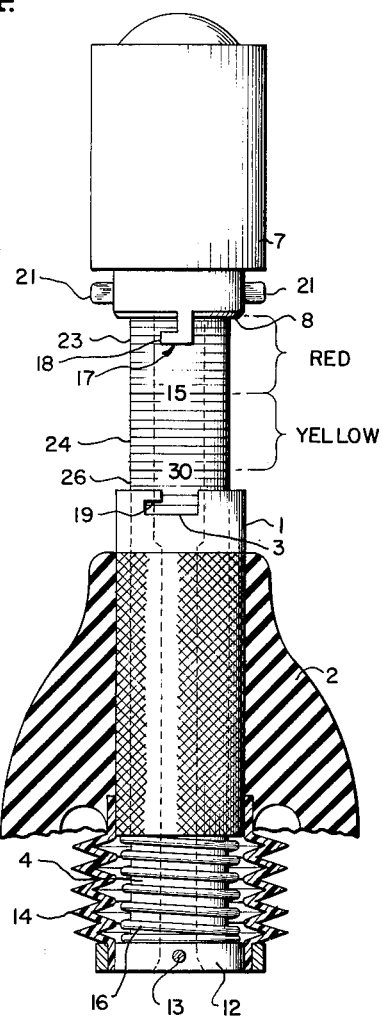
INVENTOR
WILLIAM D. STRUBY
BY *Stevens, Davis, Miller & Mosher*
ATTORNEYS

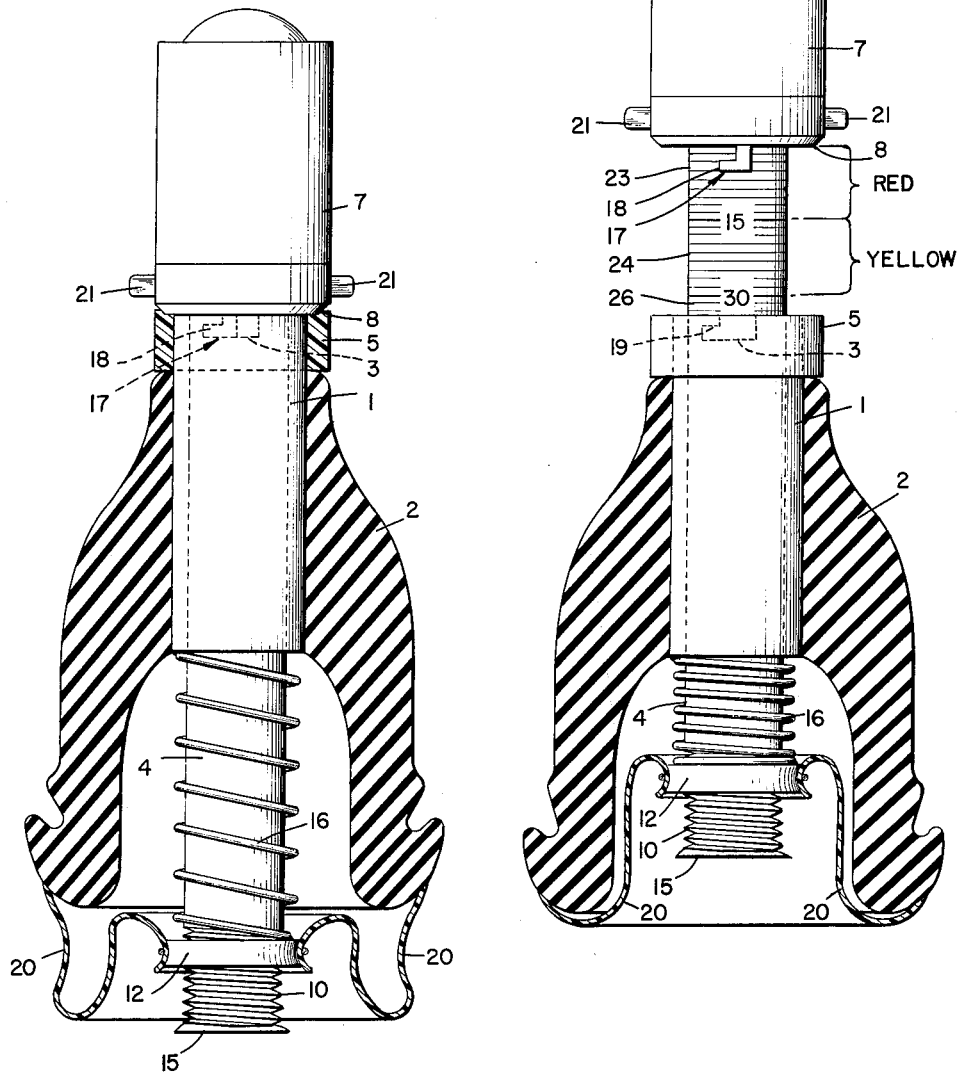

Jan. 25, 1966

W. D. STRUBY 3,230,968

COMBINATION VALVE AND GAUGE

Filed April 11, 1961

INVENTOR
WILLIAM D. STRUBY

BY *Stevens, Davis, Miller & Mosher*
ATTORNEYS

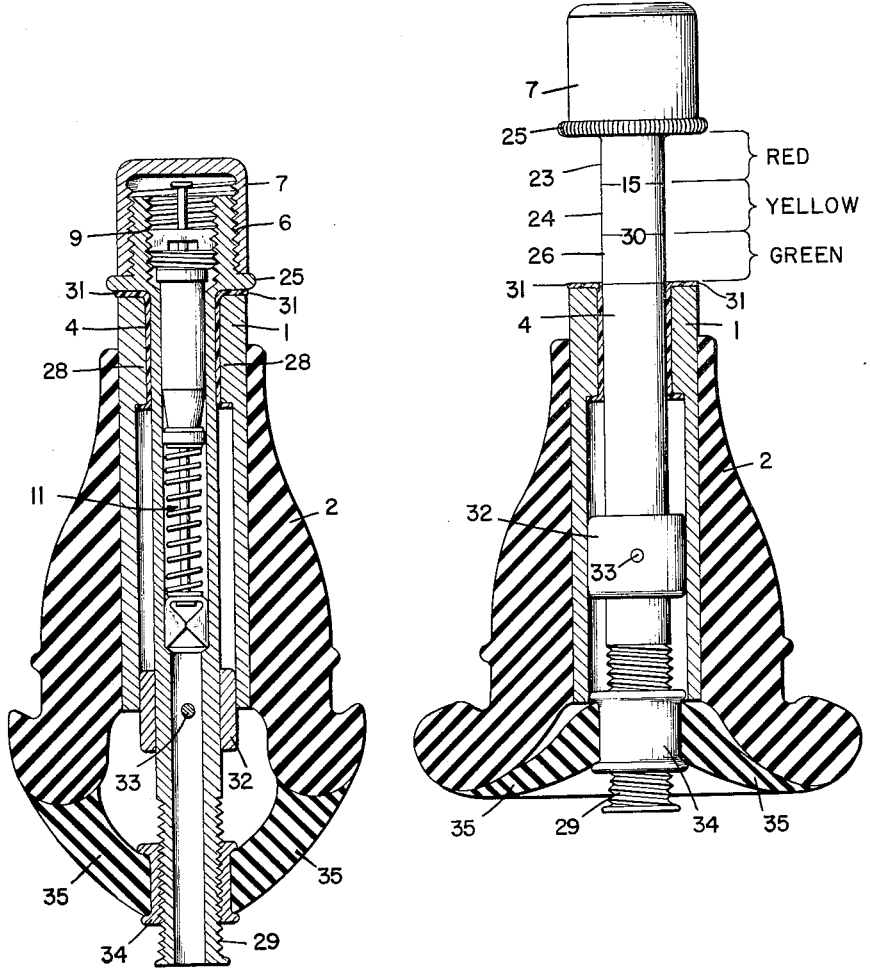

Jan. 25, 1966 W. D. STRUBY 3,230,968
COMBINATION VALVE AND GAUGE
Filed April 11, 1961 6 Sheets-Sheet 6
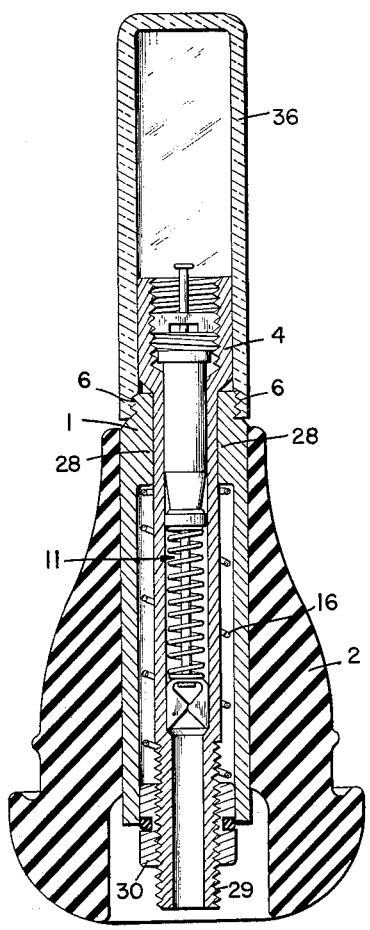
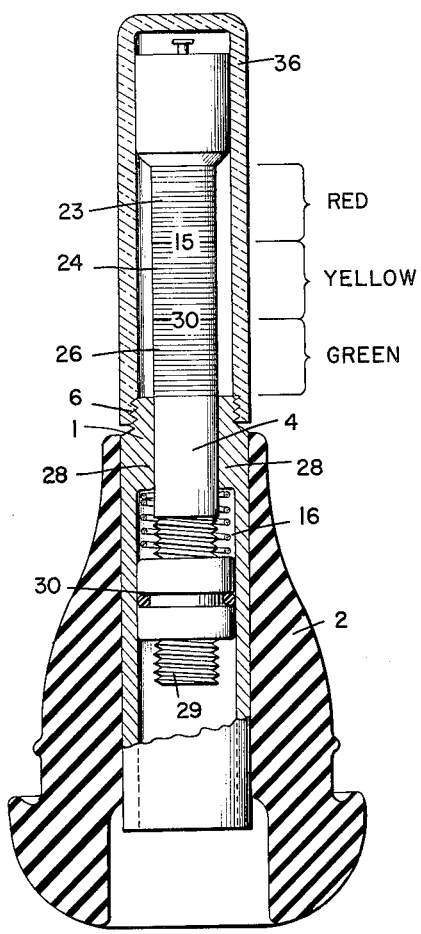
INVENTOR
WILLIAM D. STRUBY
BY *Stevens, Davis, Miller + Mosher*
ATTORNEYS

United States Patent Office 3,230,968
Patented Jan. 25, 1966

3,230,968
COMBINATION VALVE AND GAUGE
William D. Struby, 1720 Huntington,
Oklahoma City, Okla.
Filed Apr. 11, 1961, Ser. No. 102,221
7 Claims. (Cl. 137—227)

This application is a continuation-in-part of the application of William D. Struby, Serial No. 41,105, filed July 6, 1960.

The present invention relates to assemblies for pressurizable members and more particularly to a valve stem assembly which includes a pressure gauge for determining the internal pressure of the pressurizable member with which it is associated. Although the valve stem assembly of the present invention may be employed with a wide variety of pressurized members, it is particularly applicable to inner tubes and tubeless tires of motor vehicles and is described with respect to such devices.

A number of devices have been provided in the prior art which are associated with a conventional valve stem assembly of an inner tube or tubeless tire and are intended to indicate the internal pressure of the pressurizable device. The majority of these devices are removable and are attached to the outside of the conventional valve stem assembly. These devices are easily lost, stolen or damaged from dirt and objects which may be thrown up by passing vehicles. Some of these devices are intended to be integral with the valve stem assemblies, however, these devices are known to have several major drawbacks. Specifically, these devices tend to produce a loss of pressure, particularly under hot weather driving conditions, and require frequent refilling of the tire. Furthermore, the devices of the prior art permit the pressure measuring assembly to float freely in the valve stem, thereby making it subject to damage due to vibration resulting particularly from travel over rough roads and at high speeds. Another disadvantage of these devices is that they require special valve stem caps which, in addition to the inconvenience of requiring a new type of cap, are also subject to being clogged by mud and other material encountered under normal driving conditions.

It is an object of this inventon to provide a valve stem assembly including a pressure measuring apparatus which provides a seal between the valve stem and the pressure indicating device to prevent loss of air from the pressurizable member.

It is another object of this invention to provide a valve stem assembly for a pressurizable member having a pressure indicating apparatus therein, which assembly is not subject to clogging by dirt or other road grime.

It is still another object of this invention to provide a valve stem assembly for a pressurizable member including a pressure indicator wherein the pressure indicating mechanism may be locked in position during normal driving intervals to prevent undue vibration of the apparatus which would normally lead to its destruction.

Another object of this invention is to provide a valve stem assembly having a pressure indicating apparatus included therein in which the apparatus may be sealed by a conventional valve cap to eliminate the inconvenience necessitated by requirements for an unconventional closure member.

It is another object of this invention to provide a valve stem assembly having included therein a pressure indicating apparatus in which the entire assembly and apparatus comprise a few relatively moving parts which are in sealing relationship with one another to prevent leakage of air and further to minimize the possibility of damage to the members.

In accordance with the present invention there is provided a main hollow sleeve which is sealably positioned in a pressurizable member and which passes therethrough. There is also provided a hollow cylindrical member which is reciprocatably mounted in the hollow sleeve and in sealed relationship therewith. A resilient member is positioned about the hollow cylindrical member.

A conventional valve stem is mounted in the hollow tube, the pressure within the pressurizable member tending to force the hollow cylindrical member outwardly against the force of the resilient member. The body of the hollow cylindrical member is calibrated in units of pressure and may be read using the upper edge of the hollow sleeve as an indicator. The hollow cylindrical member may be adapted to be latched to the sleeve when in a fully closed position. The upper end of the hollow cylindrical member is adapted to receive a conventional valve stem cap to seal the hollow opening in the sleeve in a completely conventional manner.

When it is desired to utilize the apparatus as a pressure measuring instrument, the hollow cylindrical member is unlatched from the hollow sleeve and the upward force of the internal pressure of the pressurizable member moves the hollow cylindrical member upwardly against the force of the resilient member until an equilibrium of forces is established. At this time the scale or color indicators, as the case may be, inscribed on the body of the hollow cylindrical member may be read using the upper edge of the sleeve to provide a pressure indication. The apparatus may be employed in a conventional manner for inflating the pressurizable member either with the hollow cylindrical member in its latched or unlatched position.

It is apparent that the only additional elements of the present assembly over and above those required in a conventional valve stem assembly are the hollow sleeve, the resilient member and a sealing member between the sleeve and the hollow cylindrical member. The resilient member and the sealing member are mounted internally of the pressurizable member and therefore are not subject to fouling by dirt or other road grime or to shock from objects thrown up by passing vehicles. The hollow sleeve is a hollow tube in sealed relationship with the wall of the pressurizable member and is therefore not subject to damage.

The above and still further objects of the invention will become apparent upon consideration of the following detailed description of a few specific embodiments thereof, especially when taken in conjunction with the accompanying drawings, wherein:

FIGURE 3 is a view partly in elevation and partly in cross section of the apparatus of the embodiment of FIGURE 1 in the latched position;

FIGURE 4 is a view partly in elevation and partly in cross section of the apparatus of the embodiment of FIGURE 1 in its pressure measuring and unlatched position;

FIGURE 5 is a view partly in elevation and partly in cross section of the apparatus of a second embodiment of the invention in its latched position;

FIGURE 6 is a view partly in elevation and partly in cross section of the apparatus of the embodiment of FIGURE 5 in its pressure measuring and unlatched position;

FIGURE 9 is a view in cross section of the apparatus of a fourth embodiment of the invention in its unpressurized position;

FIGURE 10 is a view partly in elevation and partly in cross section of the apparatus of the embodiment of FIGURE 9 in its pressurized position;

FIGURE 11 is a view in cross section of the apparatus of a fifth embodiment of the invention in its unpressurized position; and FIGURE 12 is a view partly in elevation and partly in cross section of the apparatus of the embodiment of FIGURE 11 in its pressurized position.

Figure 1:
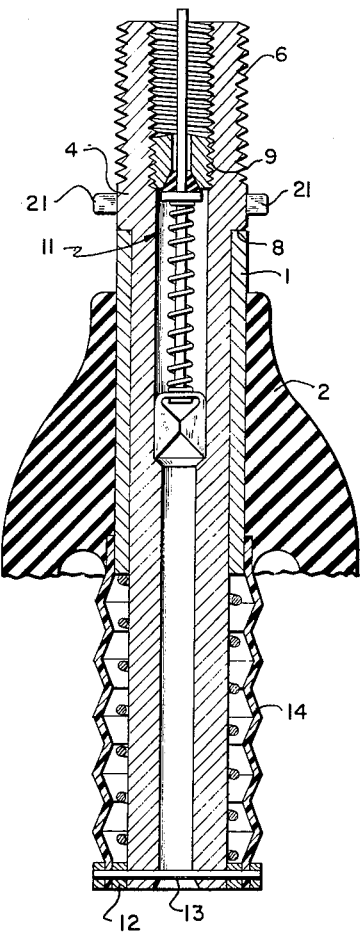
FIGURE 1 is a view in cross section of the apparatus of one embodiment of the present invention.

Referring to FIGURES 1 to 4 of the accompanying drawings, there is provided a hollow cylindrical sleeve 1 which is vulcanized in the rubber base 2 of a pressurizable or inflatable member; a tire carcass for purposes of description. The sleeve 1 extends outwardly of the carcass 2 only to the extent required to provide a latch 3 on said sleeve (to be described in greater detail subsequently) and terminates substantially flush with the inner surface of the carcass 2. A hollow cylindrical tube 4 is disposed in the sleeve 1 for reciprocating motion therein and is provided with an upper external threaded portion 6 adapted to receive a conventional cap 7. The external diameter of the tube 4 is reduced at a point somewhat below the threaded portion 6, thereby providing a shoulder 8 which is adapted to engage the outer end of the sleeve 1. The portion of the tube 4 of reduced diameter has an external diameter approximately equal to the internal diameter of the tube 1 and is snugly received in said tube 1. The upper interior portion of the tube 4 is threaded as at 9 to receive a completely conventional valve mechanism 11 which permits the tire to be inflated.

The cylindrical tube 4 extends outwardly below the sleeve 1, as illustrated in FIGURES 1, 3 and 4, and is provided at its lower end with a base member 12 extending outwardly from the tube 4 transversely to its axis. The base 12 is in sealing engagement with the tube 4 and may be retained in engagement therewith by conventional means, such as a pin 13 which passes through the base member 12 and the tube 4. A flexible, substantially cylindrical bellows 14, which may be fabricated from rubber, plastic or other flexible materials, is sealed at one end to the base member 12 and at the other end to the lower or outer portion of the sleeve 1. Specifically, the bellows 14 may overlap the lower outer portion of the sleeve 1 and be vulcanized to the carcass 2 in the same operation in which the sleeve 1 is vulcanized to the carcass.

A compression spring 16 is disposed between the tube 4 and the bellows 14 and extends between the base 12 and lower edge of the sleeve 1 in order to apply a force to maintain the tube 4 in the position illustrated in FIGURE 1; that is, with the tube 4 extending into the interior of the carcass 2 so that the shoulder 8 of the tube 8 engages the upper edge of the tube 1. Extending downward from the region of the shoulder 8 of the tube 4 is an L-shaped latching member 17 having a horizontal base 18 adapted to be disposed in the latch opening 3 in the tube 1. More specifically, the latch opening 3 has an undercut portion 19 so that a tube 4 may be pressed downwardly by an operator until the L-shaped member passes into the opening 3. The tube 4 may be rotated so that the base 18 of the L-shaped member 17 passes into the undercut region 19 of the latch opening 3 to latch the tube 4 in its inwardmost position. The tube 4 is provided with two diametrically opposed extension 21 which may be engaged by the fingers of an operator to facilitate pressing and twisting of the tube 4 to move said tube into its latched position.

If it is desired merely to inflate the tire, the cap 7 is removed from the tube 4 and a pressure hose coupling applied to the threaded portion of the tube 4 to cause air to pass through the interior of the tube and inflate the tire. In order to determine the pressure within the interior of the carcass 2, the tube 4 is rotated to remove the leg 18 of the L-shaped member 17 from the recess 19 in the latch opening 3 and the tube 4 is then free to reciprocate within the sleeve 1. The pressure exerted against the bottom of the valve 11, the lower end of the tube 4 and the base 12 causes the tube 4 to rise within the sleeve 1 against the force of the compression spring 16. Movement of the tube 4 continues until the upward force developed by the interior pressure is equal and opposite to the force of the compression spring 16 at which time the tube 4 comes to rest.

Figure 2:
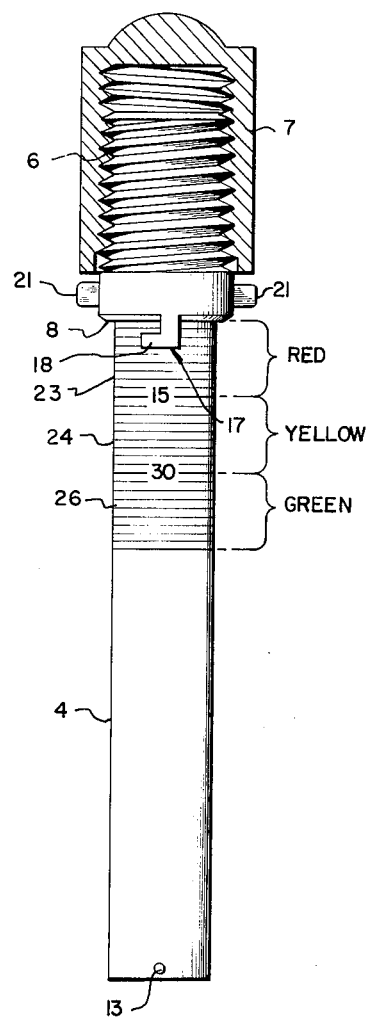
FIGURE 2 is a view partly in elevation and partly in cross section of the hollow valve stem employed in the embodiment of FIGURE 1.

The tube 4 may be provided with three color bands 23, 24 and 26 on the portion of the tube 4 of reduced diameter immediately below the shoulder 8. The band 23 is the uppermost band, as illustrated in FIGURES 2 and 4 of the accompanying drawings, and may be of a red color to indicate a low pressure within the tire. The second band 24, which is immediately below the band 23, may be a yellow color to indicate that the pressure is low but that the car may be driven. The lowermost band 26 may be of a green color to indicate that the tire is inflated to a proper pressure. In the alternative, the tube 4 may be provided with a numerical scale to provide a direct reading of pressure.

It is apparent that the sleeve 1 and the tube 4 have an airtight seal developed therebetween by means of the bellows 14 which prevents leakage of the air under pressure between said two members which otherwise would result in a gradual deflation of the tire. In order to minimize the amount of dirt which may enter between the sleeve 1 and the tube 4, the elements are dimensioned so that the shoulder 8 of the tube 4 is in tight contact when latched with the sleeve 1 about its entire periphery except in the region of the latch opening 3 in the sleeve 1. Under these circumstances, the only opening in the assembly which could permit the entry of dirt is the small region of the opening 3 which is not occupied by the L-shaped member 17 of the tube 4. This region is so small that substantially no trouble is experienced with dirt entering through this opening. Furthermore, it will be noted that the apparatus is extremely simple since it merely requires a sleeve 1, a spring 16 and a bellows 14 in addition to a conventional valve stem apparatus. The latter two of these elements are disposed within the pressurized region of the carcass 2 and therefore are not subject to damage from the external environment.

FIGURES 5 and 6 set forth a second embodiment of the invention which contains the same structure as the embodiment of FIGURES 1 to 4 where designated by the same character designation in the drawings. In addition, the second embodiment includes a transparent lock cover band seal 5 covering the L-shaped latch opening 3 which provides a seal against the shoulder 8. The upper portion of the tube 4 has a slightly increased outside diameter to provide a perfect fit. This serves as a seal against possible leakage of air from the inside and grime from the outside and damps vibration between relative moving parts of the tire check during normal driving operations.

The embodiment of FIGURES 5 and 6 further includes a threaded portion 10 at the bottom of the hollow cylindrical tube 4 which is engaged by a corresponding threaded portion (not shown) on the inside of the base 12. The spring 16 is locked to the base 12 at one end and to the sleeve 1 at the other end. By rotating the tube 4 while it is in the unlocked position, the spring tension can be increased or decreased, depending upon the direction of rotation. The number of revolutions that can be made is predetermined by, for example, the flared end 15 of the tube 4 or by a pin (not shown) extending through the bottom of the tube 4. This modification permits adjustment of spring tension for purposes of calibration due to possible fatigue in the spring arising from prolonged use.

The embodiment of FIGURES 5 and 6 is further provided with a bellows 20 which is attached at one end to the lower outside surface of the carcass 2 and at its other end to the base 12. This type of airtight seal takes the form of a diaphragm and could be used to great advantage in a tubeless tire which employs a boot in seating the valve.

The embodiment of FIGURES 5 and 6 operates in substantially the same manner as does the embodiment of FIGURES 1 to 4.

Figure 7:
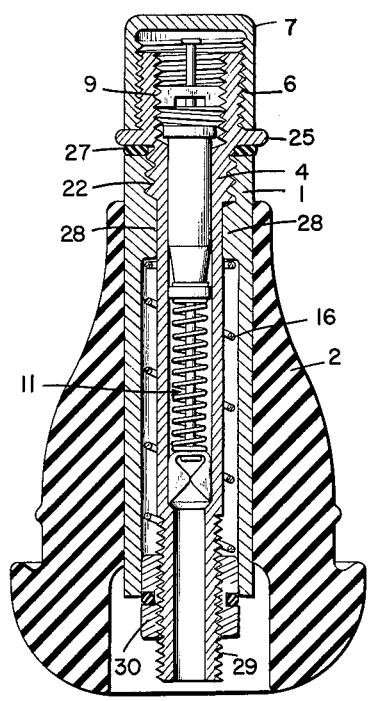
FIGURE 7 is a view in cross section of the apparatus of a third embodiment of the invention in its latched position.
Figure 8:
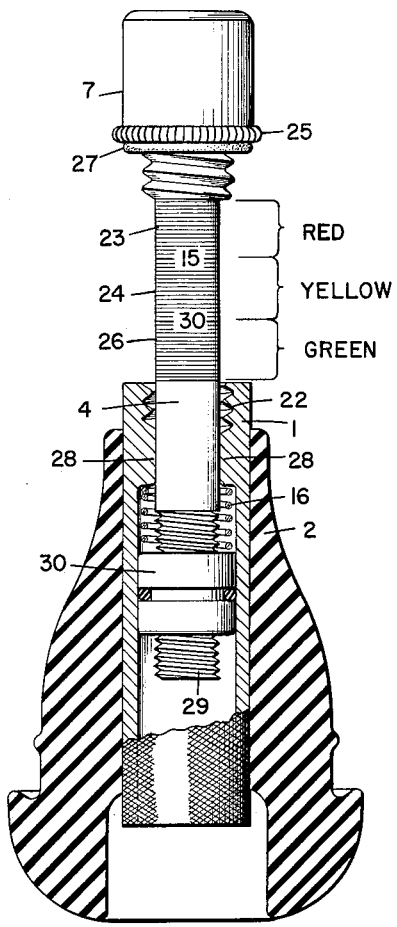
FIGURE 8 is a view partly in elevation and partly in cross section of the apparatus of the embodiment of FIGURE 7 in its pressurized and unlatched position.

FIGURES 7 and 8 set forth a third embodiment of the invention wherein there is provided a hollow cylindrical sleeve 1 which is vulcanized in the rubber base 2 of an inflatable member, such as a tire carcass. The sleeve 1 extends outwardly of the carcass 2 by a predetermined amount and terminates inwardly of the inner surface of the carcass. The sleeve 1 is provided with an upper internal threaded portion 22 (to be described in greater detail later). A hollow cylindrical tube 4 is disposed in the sleeve 1 for reciprocating motion therein and is provided with an external threaded portion 6 adapted to receive a conventional cap 7. The external diameter of the tube 4 includes a second threaded portion 22 of somewhat reduced diameter at a point somewhat below the threaded portion 6. The tube 4 further includes an extension 25 having a serrated periphery between threaded portions 6 and 22. A rubber seal 27 is positioned about tube 4 immediately below the extension 25 and is adapted to engage the outer end of the sleeve 1. The external diameter of the tube 4 is still further reduced at a point somewhat below the threaded portion 22. The portion of the tube 4 of reduced diameter has an external diameter approximately equal to the diameter of the tube 1 at its wider portion 28 and is snugly received in said tube 1 at said wider portion 28. The interior of the tube is threaded as at 9 to receive a completely conventional valve mechanism 11 which permits the tire to be inflated.

The cylindrical tube 4 extends outwardly below the sleeve 1 and is provided at its lower end with an external threaded portion 29 which is engaged by a corresponding threaded portion on the inner side of airtight piston plunger 30. The piston plunger 30 is also in sealing engagement with the inner walls of the sleeve 1 by means of an O ring to form an airtight seal between the tube 4 and the sleeve 1.

A compression spring 16 is disposed between the tube 4 and the sleeve 1 and extends between the wider portion 28 of the sleeve 1 and the piston plunger 30 in order to apply a force to maintain the tube 4 in the position illustrated in FIGURE 7.

To operate the embodiment of FIGURES 7 and 8, the operator twists the tube 4 by grasping the extension 25 and twisting it about ¾ of a turn or until the tube 4 ceases to be in threaded engagement with the sleeve 1. The air from within the carcass 2 will push against the valve mechanism 11 and the piston plunger 30 to force the tube 4 to rise within the sleeve 1 against the force of the compression spring 16. Movement of the tube 4 continues until the upward force developed by the interior pressure is equal and opposite to the force of the compression spring 16 at which time the tube 4 comes to rest. The tube may be provided with color bands 23, 24 and 26 or with a numerical scale as set forth in conjunction with the description of the embodiment of FIGURES 1 to 4.

In order to calibrate the apparatus the tube 4 is rotated when in the unlocked or extended position, thereby causing the piston plunger 30 with which it is threadably engaged to move up or down the tube 4 along threads 29. The direction of motion of the piston plunger 30 will depend upon the direction of rotation of the tube 4. The position of the piston plunger 30 will directly affect the force exerted by the compression spring 16 to counteract the outward movement of the tube 4 due to the pressure within the tire 4.

It should be noted that when the apparatus is in its latched position, as shown in FIGURE 7, the rubber seal 27 is positioned between the sleeve 1 and the tube 4 to form an airtight seal between these members, thereby keeping out grit and grime, and simultaneously preventing parts 1 and 4 from accidentally becoming disengaged.

FIGURES 9 and 10 set forth a fourth embodiment of the invention wherein there is provided a hollow cylindrical sleeve 1 which is vulcanized in the rubber base 2 of an inflatable tire carcass. The sleeve 1 extends outwardly of the carcass 2 by a predetermined amount and terminates inwardly at substantially the inner surface of the carcass. The sleeve 1 is provided with a wider portion 28 at its uppermost portion. A hollow cylindrical tube 4 is disposed in the sleeve 1 for reciprocating motion therein and is provided with an external threaded portion 6 adapted to receive a conventional cap 7. The tube 4 is further provided with a conventional valve mechanism 11 and an extension 25 below the threaded portion 6. A seal bearing 31 is positioned on the inner surface of the sleeve 1 about the portion 28 which is in sealing engagement with the tube 4, along and beneath the extension 25, to prevent the escaping of air from within the carcass 2.

A bearing 32 is positioned in abutting and sealing relationship with the tube 4 and the sleeve 1. The bearing 32 is held in place by a pin 33 which extends through the bearing 32 and the tube 4. The bearing 32 is capable of slidable reciprocating movement within the sleeve 1 and is so positioned on the tube 4 that it remains within the tube 4 for all possible positions of the tube.

The cylindrical tube 4 extends outwardly below the sleeve 1 and is provided with an external threaded portion 29 at its lower end which is engaged by a corresponding threaded portion on the inner side of an airtight tension adjuster screw 34. A diaphragm 35 which can be, for example, of a relatively heavy plastic or rubber is vulcanized to the carcass 2 and the tension adjuster screw 34.

It should be noted that a compression spring is not required in this embodiment because the pressure from within the carcass 2 will create a force against the diaphragm 35, the amount of upward deformation of the diaphragm 35 being indicative of the pressure within the carcass.

The tube 4 is provided with color bands 23, 24 and 26 or with a numerical scale and a conventional valve mechanism 11 as set forth in conjunction with the embodiment of FIGURES 1 to 4.

The embodiment of FIGURES 9 and 10 can be calibrated by merely rotating the tube 4 as set forth in connection with the prior embodiments.

It should be noted that this embodiment will be fabricated from heavy-duty materials since it must withstand greater vibrations than the prior embodiments due to the lack of a latching device.

FIGURES 11 and 12 set forth a fifth embodiment of the invention which contains the same structure as the embodiment of FIGURES 7 and 8 where designated by the same character designation in the drawings. This embodiment differs from that of FIGURES 7 and 8 in that it is provided with a transparent cap 36 which is sufficiently large so that the tube 4 is enclosed within the cap at all times and for all possible positions that it is capable of attaining.

This embodiment does not include apparatus to latch it, this being unnecessary since grit and grime are kept out by the cap 36. In all other respects this embodiment operates in the same manner as the embodiment of FIGURES 7 and 8.

In order to determine the pressure the operator need only glance at the markings 23, 24 and 26 (explained fully with respect to the embodiment of FIGURES 1 to 4) through the transparent cap 36.

It has been stated that the apparatus is applied to the carcass of a conventional rubber automobile tire, this being true, of course, when the apparatus is emloyed with a tubeless tire. In those instances in which the apparatus is to be employed with an inner tube, the sleeve 11 would be vulcanized in the wall of the inner tube rather than the tire carcass as previously stated. The apparatus of the invention can also be used in a conventional way with tubeless tires by securing same in a hole in the metal rim of the wheel. As will be evident, the member 2, as illustrated in the several figures, is conventionally and specially adapted for this purpose.

It should be noted that this invention need not be incorporated in a tire valve, but, on the other hand, it can be used without a valve. For example, it may be used with only a sleeve. Furthermore, the invention can be used as a pressure gauge apart from any reference to automobile tires. Accordingly, though the invention has been described with respect to specific embodiments, many variations will be obvious to those skilled in the art. It is therefore the intention to be limited only as indicated by the scope of the following claims which are to be interpreted as broadly as possible in view of the prior art.

What is claimed is:

1. The combination comprising, hollow sleeve means including a rigid sleeve with a resilient body molded to the exterior of said sleeve adapted to secure said sleeve in an opening in the wall of an inflatable means, said sleeve extending substantially throughout the length of the resilient body, a hollow tube received for reciprocating movement within said sleeve with one end thereof projecting out of one end of said sleeve, sealing means sealing the other end of said hollow tube and said hollow sleeve means preventing the passage of air therebetween, a pressure actuated valve means mounted in said hollow tube, pressure responsive means for imparting a force to the other end of said hollow tube and having a resilient portion for biasing said hollow tube to project out of the other end of said hollow sleeve, means for indicating the extent of projection of said one end of said hollow tube out of said one end of said sleeve in accordance with the pressure encountered by the pressure responsive means, and adjusting means located at said other end of said tube for enabling axial adjustment of said tube relative to said rigid sleeve.

2. The combination as defined in claim 1 wherein a latch member is mounted on said hollow tube adjacent said one end and cooperates with a latch receiving means defined by said rigid sleeve.

3. The combination as defined in claim 1 wherein said sealing means and adjusting means comprise an annular member threadedly engaged with the other end of said hollow tube, said annular member defining a circumferential groove in which is seated a sealing ring for cooperating with the inner surface of said rigid sleeve.

4. The combination as defined in claim 1 further including a transparent cap threadedly engaged with said one end of said sleeve and extending sufficiently above said sleeve to accommodate the projecting end of said sleeve.

5. The combination as defined in claim 1 wherein said sealing means is comprised of a diaphragm attached at one end to said other end of said hollow tube and is attached as its other end to the other end of said rigid sleeve and wherein said resilient portion is comprised of a spring bearing against the other end of said rigid sleeve and said other end of said hollow tube.

6. The combination as defined in claim 5 wherein said other end of said hollow tube is threaded and said diaphragm is secured to said adjusting means which comprises a threaded ring mounted on the threaded other end of said hollow tube.

7. The combination comprising, a rigid sleeve, a resilient body molded to the exterior of said sleeve adapted to secure said sleeve in an opening in the wall of an inflatable means, a hollow tube received for rotating and reciprocating movements within said sleeve and projecting out of both ends of said sleeve, an annular member threadedly engaged with the exterior surface of one end of said hollow tube, a resilient diaphragm sealed to said resilient body and said annular member, a bearing mounted on the external surface of said tube for cooperating with the inner surface of said sleeve to prevent the passage of air therebetween, a pressure actuated valve mounted in said tube, means for indicating the extent of projection of the other end of said tube out of said sleeve in accordance with the pressure encountered by said diaphragm, the other end of said tube being threaded and a cap mounted on the threaded other end of said tube.

References Cited by the Examiner

UNITED STATES PATENTS

| | | | |
|---|---|---|---|
| 1,129,450 | 2/1915 | Campbell | 73—419 |
| 1,214,781 | 2/1917 | Harrison et al. | 73—146.2 |
| 1,237,512 | 8/1917 | Harrison et al. | 73—146.2 |
| 1,506,738 | 9/1924 | Earnheart | 73—146.3 |
| 1,706,855 | 3/1929 | Larson et al. | 73—146.3 |
| 2,758,081 | 8/1956 | Iknayan | 137—223 |

FOREIGN PATENTS 416,319  11/1946  Italy.

LOUIS R. PRINCE, *Primary Examiner.*

CHARLES A. CUTTING, JOSEPH P. STRIZAK, RICHARD C. QUEISSER, *Examiners.*